Patented Aug. 22, 1944

2,356,564

UNITED STATES PATENT OFFICE 2,356,564

METHOD OF MANUFACTURING PRODUCTS FROM RUBBER AND PRODUCTS OBTAINED THROUGH SAID METHOD

André Chomette, Neuilly-sur-Seine, and Robert Thiollet, Paris, France; vested in the Alien Property Custodian No Drawing. Application May 15, 1940, Serial No. 335,356. In France June 13, 1939

2 Claims. (Cl. 260—767)

The rubber industry makes use, at the present time, of certain organic products in order to accelerate vulcanization or in order to improve the preservation of vulcanized rubber articles.

These products, which belong to various chemical species, comprise, in particular, compounds in the constitution of which amino groups are present. Such products quickly assume intensive greyish or brownish colorations when they are exposed to the combined actions of air and light.

As they are soluble in rubber, these products have a tendency of diffuse in the vulcanized mixtures, while forming on their surface a highly coloured layer. This coloration is not perceptible in the case of mixtures of black or dark colour, but it makes it wholly impossible to make use of certain accelerators and anti-oxidant compounds in the case of white or light coloured rubber mixtures.

It is easy to select non-colouring accelerators. Thiurames, thiazols and dithiocarbamates do not produce any modification of the shade of the objects subjected to the sun light.

On the contrary, the most efficient anti-oxidant compounds, such as phenyl-naphthylamines or aldol-naphthylamines, produce an intensive brown coloration, under the same conditions.

It has already been attempted to overcome this drawback by preparing anti-oxidant compounds which are only slightly soluble in rubber and more stable against the action of light. These products diffuse but very slowly toward the surface and, accordingly, the coloration of the manufactured articles is much less intensive. For instance, it has already been suggested to make use of phenolic compounds, which are less soluble in rubber than amino derivatives, and assume a lesser coloration under the action of light, for instance parahydroxy-di-phenyl, beta-naphthol, methylene di-beta-naphthol, and the like.

However, even when making use of anti-oxidant bodies of this kind, the discoloration of the objects subjected to the action of light is still considerable. Ultra-violet rays considerably increase the development of this discoloration.

If, on the surface of a vulcanized mixture containing an anti-oxidant, there is applied a film of a transparent substance capable of stopping ultra-violet rays, it is found that the brown colouring takes place much more slowly at the places where the film is applied.

However, it would not be feasible to protect the rubber objects by coating them with a film opaque to ultra-violet rays. This film would most probably be quickly lost, especially when the problem is to protect cushions or mats intended to undergo friction of other objects or mechanical stresses.

The object of the present invention is to provide a method of producing rubber articles which avoids the above drawbacks.

According to the essential feature of the present invention, we incorporate, into rubber mixtures, substances capable of stopping ultra-violet rays. These substances constitute a screen which is opaque to said rays and which, therefore, prevents the development of the staining induced by the presence, in rubber, of some auxiliary products.

We have obtained a great number of mixtures of the kind above referred to by incorporating therein various substances which are opaque to ultra-violet rays, and we have determined the proportions of said substances to be utilized in order to obtain a satisfactory protection against the action of light.

We have found that the substances with which the most satisfactory results are obtained are the following: urea, thio-urea, their products of condensation with aldehydes, their substitution derivatives and their salts, such for instance as urea benzoate, or the like.

From 0.5 to 10 per cent of these substances, on the weight of the mixture, are enough to obtain a highly satisfactory protection.

In order to facilitate the dispersion of the protective materials, it may be advantageous to incorporate them in the rubber mass at the same time as a conventional dispersing body or after having dissolved them in a suitable solvent.

We also consider the formation of artificial resins "in situ." In this way we obtain an intimate mixture of the plastic material and of the rubber mass of the article.

Example

The following mixtures are prepared for comparison purposes:

| | A | B |
|---|---|---|
| Crepe | 100 | 100 |
| Zinc oxide | 100 | 100 |
| Sulphur | 2 | 2 |
| Zinc ethylphenyldithiocarbamate | 1 | 1 |
| Methylene-di-betanaphthol | 1 | 1 |
| Aqueous solution of dimethylolurea of 50 per cent | 0 | 8 |

In the course of the vulcanization operation dimethylolurea condenses into a plastic substance which is perfectly well dispersed in the whole mass of the mixture.

After several days of insolation the sample prepared from mixture B is not coloured, while the sample obtained with mixture A has become a pinkish grey.

The method according to the invention which permits of avoiding discoloration of objects under the influence of light applies to the protection of the objects manufactured from coagulated rubber or latex, from artificial elastic matters similar to rubber, or from their aqueous dispersions.

In a general manner, while we have, in the above description, what we deem to be a practical and efficient embodiment of the present invention, it should be well understood that we do not wish to be limited thereto as there might be changes made therein without departing from the principle of the present invention as comprehended within the scope of the appended claims.

What we claim is:

1. The process for the manufacture of articles resistant to discoloration by light from rubber mixtures containing a light stainable anti-oxidant compound selected from the group consisting of aldol naphthylamine and phenyl naphthylamine, which process comprises incorporating into the initial mixture of rubber, an accelerator and said anti-oxidant, an aqueous solution of dimethylolurea, and subsequently vulcanizing said mixture with consequent polymerization of dimethylolurea, thereby forming a protective screen of synthetic resin opaque to ultraviolet rays.

2. Manufactured articles resistant to discoloration by light from rubber mixtures of the composition defined and by the process set forth in claim 1.

ANDRÉ CHOMETTE.
ROBERT THIOLLET.